US011865952B2

(12) United States Patent
Shibata

(10) Patent No.: US 11,865,952 B2
(45) Date of Patent: Jan. 9, 2024

(54) VEHICLE SEAT LEVER TO PROVIDE SPACE SAVING

(71) Applicant: TOYOTA BOSHOKU KABUSHIKI KAISHA, Aichi-Ken (JP)

(72) Inventor: Atsushi Shibata, Togo-cho (JP)

(73) Assignee: TOYOTA BOSHOKU KABUSHIKI KAISHA, Aichi-ken (JP)

(*) Notice: Subject to any disclaimer, the term of this patent is extended or adjusted under 35 U.S.C. 154(b) by 214 days.

(21) Appl. No.: 17/493,019

(22) Filed: Oct. 4, 2021

(65) Prior Publication Data
US 2022/0105834 A1 Apr. 7, 2022

Related U.S. Application Data
(60) Provisional application No. 63/087,715, filed on Oct. 5, 2020.

(51) Int. Cl.
*B60N 2/08* (2006.01)
*B60N 2/90* (2018.01)

(52) U.S. Cl.
CPC .......... *B60N 2/0806* (2013.01); *B60N 2/919* (2018.02)

(58) Field of Classification Search
CPC ... B60R 5/04; B60R 2022/1818; B60R 22/00; B60N 2/06; Y10S 292/31; Y10S 292/30; Y10T 70/5761; Y10T 292/1039
See application file for complete search history.

(56) References Cited

U.S. PATENT DOCUMENTS

| 4,747,632 A * | 5/1988 | Joy ........................ E05B 79/20 292/DIG. 31 |
| 4,889,373 A * | 12/1989 | Ward .................... E05B 13/002 292/DIG. 31 |
| 5,292,159 A * | 3/1994 | Sandhu .................. E05B 77/06 292/DIG. 31 |
| 7,093,902 B2 | 8/2006 | Lehmann et al. |
| 7,097,020 B2 | 8/2006 | Brown |
| 7,222,907 B2 | 5/2007 | Lutzka et al. |
| 7,530,638 B2 | 5/2009 | Day et al. |
| 7,810,779 B2 | 10/2010 | Jessup et al. |
| 7,971,920 B2 | 7/2011 | Jang et al. |
| 8,033,608 B2 | 10/2011 | Yoshida et al. |
| 8,757,719 B2 | 6/2014 | Hayakawa |
| 10,549,655 B2 | 2/2020 | Sasaki et al. |
| 10,744,907 B2 | 8/2020 | Kim |
| 2015/0306978 A1* | 10/2015 | Watanabe ............ B60N 2/6009 297/452.48 |
| 2018/0163442 A1* | 6/2018 | Soonthornwinate .... E05B 79/06 |

FOREIGN PATENT DOCUMENTS

EP 634549 A1 * 1/1995 ............. E05C 1/145

* cited by examiner

*Primary Examiner* — Sarah B McPartlin
(74) *Attorney, Agent, or Firm* — GREENBLUM & BERNSTEIN, P.L.C.

(57) ABSTRACT

In one example, a lever assembly includes a slide housing including aligned holes and a slide lever received in the slide housing. The slide lever includes aligned holes, and the slide lever includes a body portion having a length and a recess approximately near a center of the length. The lever assembly includes a pin received in the aligned holes of the slide lever and the slide housing, allowing the slide lever to rotate about the pin relative to the lever housing, wherein the pin is received in the recess.

21 Claims, 2 Drawing Sheets

VEHICLE SEAT LEVER TO PROVIDE SPACE SAVING

CROSS-REFERENCE TO RELATED APPLICATION

This application claims the benefit of U.S. Provisional Application No. 63/087,715 filed on Oct. 5, 2020.

BACKGROUND

A slide lever assembly includes a lever and a shaft about which the lever rotates.

SUMMARY

In one example, a lever assembly includes a slide housing including aligned holes and a slide lever received in the slide housing. The slide lever includes aligned holes, and the slide lever includes a body portion having a length and a recess approximately near a center of the length. The lever assembly includes a pin received in the aligned holes of the slide lever and the slide housing, allowing the slide lever to rotate about the pin relative to the lever housing, wherein the pin is received in the recess.

In another embodiment, the slide lever comprises plastic.

In another embodiment, the pin comprises metal.

In another embodiment, the lever assembly includes a resilient member, and the pin is received in the resilient member to maintain the slide lever in a desired position.

In another embodiment, the resilient member is a spring.

In another embodiment, the slide lever includes a body portion and a flange that extends from the body portion, the flange defining a face.

In another embodiment, the face is substantially smooth and has a curved front profile, and another recess is defined between the flange and the body portion.

In another embodiment, an entirety of the slide lever is retained in the lever housing.

In another embodiment, almost an entirety of the slide lever is retained in the lever housing.

In another example, a lever assembly includes a slide housing including aligned holes and a slide lever received in the slide housing. The slide lever includes aligned holes and a body portion having a length and a recess approximately near a center of the length. The slide lever includes a body portion and a flange that extends from the body portion. The flange defines a face, and the face is substantially smooth and has a curved front profile. Another recess is defined between the flange and the body portion, and almost an entirety of the slide lever is retained in the lever housing. The lever assembly includes a pin received in the aligned holes of the slide lever and the slide housing, allowing the slide lever to rotate about the pin relative to the lever housing, wherein the pin is received in the recess. The lever assembly includes a resilient member, and the pin is received in the resilient member to maintain the slide lever in a desired position.

In another embodiment, the slide lever comprises plastic.

In another embodiment, the pin comprises metal.

In another embodiment, an entirety of the slide lever is retained in the lever housing.

In another example, a vehicle seat includes a side shield, seat rails, and sliders that slide on the seat rails. The vehicle seat includes a lever assembly mounted on the side shield, wherein activation of the lever assembly causes the slides to slide on the seat rails to move the vehicle seat. The lever assembly includes a slide housing including aligned holes and a slide lever received in the slide housing. The slide lever includes aligned holes, and the slide lever includes a body portion having a length and a recess approximately near a center of the length. The vehicle seat includes a pin received in the aligned holes of the slide lever and the slide housing, and activation of the slide lever relative to the housing rotates the slide lever about the pin relative to the lever housing to allow the slider to slide on the seat rails, wherein the pin is received in the recess.

In another embodiment, the face is substantially smooth and has a curved front profile, and another recess is defined between the flange and the body portion.

In another embodiment, an entirety of the slide lever is retained in the lever housing.

In another embodiment, almost an entirety of the slide lever is retained in the lever housing.

DETAILED DESCRIPTION

Figure 1:
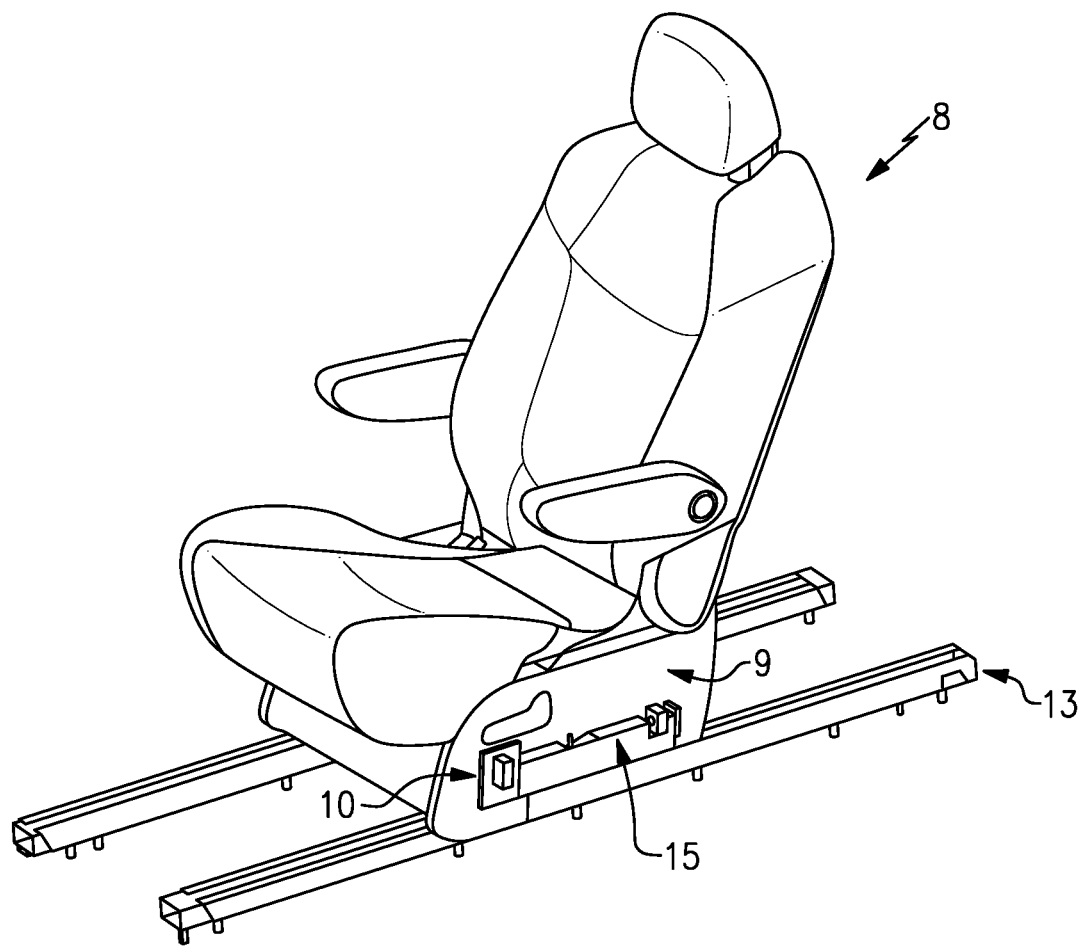
FIG. 1 illustrates a vehicle seat with a lever assembly.

FIG. 1 shows a vehicle seat 8 and a lever assembly 10. The lever assembly 10 is mounted on a side shield 9, allowing the vehicle seat 8 to slide on seat rails 13 with sliders 15. A slide lever 14 (shown in FIG. 2) can rotate about a pin 16 to pull a cable (not shown) and release a slider function mechanism to allow the vehicle seat 8 to slide on the seat rails 13.

Figure 2:
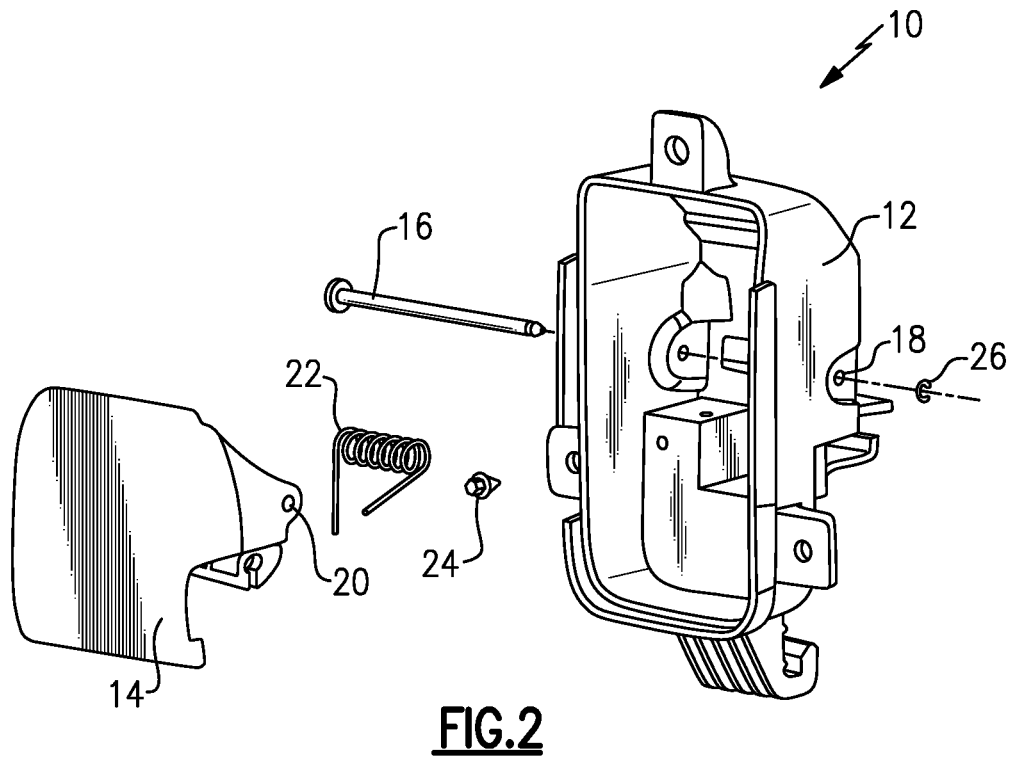
FIG. 2 illustrates an exploded perspective view of the lever assembly.

As shown in FIG. 2, the slide lever 14 is received in a lever housing 12. In one example, the slide lever 14 is plastic. The lever housing 12 includes aligned holes 18 that receive the pin 16 (or shaft). In one example, the pin 16 is metal. The slide lever 14 also includes aligned holes 20. The holes 18 of the lever housing 12 and the holes 20 of the slide lever 14 align to receive the pin 16, allowing the slide lever 14 to rotate about the pin 16 relative to the lever housing 12. A nut 24 secures the pin 16 in the holes 18 and 20 in the lever housing 12 and the slide lever 14, respectively. The pin 16 is received in a resilient member 22, such as a spring, that maintains the slide lever 14 in a desired position. A stopper 26 prevents any abnormal noise.

Figure 3:
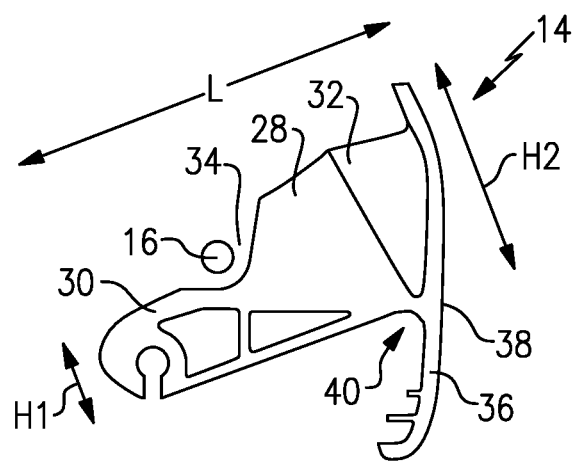
FIG. 3 illustrates a side view of a lever and a shaft of the lever assembly.

As shown in FIG. 3, in one example, the slide lever 14 includes a body portion 28 having a length L including a first portion 30 and a second portion 32, and a recess 34 is located between the first portion 30 and the second portion 32. In one example, the recess 34 is substantially in the center of the length L of the slide lever 14. In another example, the recess 34 is slightly offset from the center of the length L of the slide lever 14. In another example, the recess 34 is near the center of the length L of the slide lever 14. The pin 16 is received in the recess 34, and the slide lever 14 rotates about the pin 16.

The first portion 30 has a height H1 that is less than a height H2 of the second portion 32 of the slide lever 14. The slide lever 14 includes a flange 36 that extends from the second portion 32 to define a face 38. In one example, the face 38 is substantially smooth and has a curved front profile. A recess 40 is defined between the flange 36 and the body portion 28 of the slide lever 14. Due to the location of the pin 16 relative to the slide lever 14 and the lever housing 12, all or almost all of the slide lever 14 is retained in the lever housing 12.

By locating the pin 16 near the middle of the body portion 28 of the side lever 14, the overall length of the slide lever 14 from the pin 16 that defines a pivot point to the face 38 of the slide lever 14 is reduced, allowing more of the slide lever 14 to be located in the lever housing 12. This reduces the amount of the slide lever 14 that protrudes from the lever housing 12. A rotational trajectory of the slide lever 14 is smaller as the pin 16 is set or located inside the slide lever 14 and away from ends of the slide lever 14, promoting effective use of packaging space.

In one example, the slide lever 14 is entirely maintained within the lever housing 12. In one example, the slide lever 14 is almost entirely maintained within the lever housing 12. By maintaining enough space between a vehicle seat 8 and an interior trim of the vehicle, the vehicle seat 8 can be moved farther in distance. The rotational trajectory of the slide lever 14 is more compact by locating the pin 16 inside the slide lever 14, as opposed to an end region of the slide lever 14. Additionally, wider operational space is provided to the end user.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A lever assembly comprising:
   a slide housing including aligned housing holes;
   a slide lever received in the slide housing, wherein the slide lever includes aligned lever holes, and the slide lever includes a body portion having a length and a recess approximately near a center of the length; and
   a pin received in the aligned lever holes and the aligned housing holes, allowing the slide lever to rotate about the pin relative to the lever housing, wherein the pin is received in the recess,
   wherein the aligned housing holes are located adjacent to a back wall of the slide housing.

2. The lever assembly as recited in claim 1 wherein the slide lever comprises plastic.

3. The lever assembly as recited in claim 1 wherein the pin comprises metal.

4. The lever assembly as recited in claim 1 including a resilient member, wherein the pin is received in the resilient member to maintain the slide lever in a desired position.

5. The lever assembly as recited in claim 4 wherein the resilient member is a spring.

6. The lever assembly as recited in claim 1 wherein the slide lever includes a flange that extends from the body portion, the flange defining a face.

7. The lever assembly as recited in claim 6 wherein the face is substantially smooth and has a curved front profile, and another recess is defined between the flange and the body portion.

8. The lever assembly as recited in claim 1 wherein an entirety of the slide lever is retained in the lever housing.

9. The lever assembly as recited in claim 1 wherein almost an entirety of the slide lever is retained in the lever housing.

10. The lever assembly as recited in claim 1 wherein the aligned lever holes are located approximately near a middle of the body portion.

11. The lever assembly as recited in claim 1 wherein a face of the slide lever has a lower half portion and an upper half portion, and the rotation of the slide lever about the pin relative to the lever housing causes the lower half portion to rotate outside of the housing and the upper half portion to rotate inside the housing.

12. The lever assembly as recited in claim 1 wherein the slide housing has a height and the aligned housing holes are arranged at an approximate middle region of the height.

13. The lever assembly as recited in claim 1 wherein an upper surface of the slide lever is curved.

14. A lever assembly comprising:
   a slide housing including aligned housing holes;
   a slide lever received in the slide housing, wherein the slide lever includes aligned lever holes, the slide lever includes a body portion having a length and a recess approximately near a center of the length, the slide lever includes a flange that extends from the body portion, the flange defining a face, the face is substantially smooth and has a curved front profile, another recess is defined between the flange and the body portion, and almost an entirety of the slide lever is retained in the lever housing;
   a pin received in the aligned housing holes and the aligned lever holes, allowing the slide lever to rotate about the pin relative to the lever housing, wherein the pin is received in the recess; and
   a resilient member, wherein the pin is received in the resilient member to maintain the slide lever in a desired position,
   wherein the aligned housing holes are located adjacent to a back wall of the slide housing.

15. The lever assembly as recited in claim 14 wherein the slide lever comprises plastic.

16. The lever assembly as recited in claim 14 wherein the pin comprises metal.

17. The lever assembly as recited in claim 14 wherein an entirety of the slide lever is retained in the lever housing.

18. A vehicle seat comprising:
   a side shield;
   seat rails;
   sliders that slide on the seat rails;
   a lever assembly mounted on the side shield, wherein activation of the lever assembly causes the sliders to slide on the seat rails to move the vehicle seat, the lever assembly including:
   a slide housing including aligned housing holes;
   a slide lever received in the slide housing, wherein the slide lever includes aligned lever holes, and the slide lever includes a body portion having a length and a recess approximately near a center of the length, and
   a pin received in the aligned housing holes and the aligned lever holes, and activation of the slide lever relative to the housing rotates the slide lever about the pin relative to the lever housing to allow the slider to slide on the seat rails, wherein the pin is received in the recess,
   wherein the aligned housing holes are located adjacent to a back wall of the slide housing.

19. The vehicle seat as recited in claim 18 wherein the face is substantially smooth and has a curved front profile, and another recess is defined between the flange and the body portion.

20. The vehicle seat as recited in claim 18 wherein an entirety of the slide lever is retained in the lever housing.

21. The vehicle seat as recited in claim 18 wherein almost an entirety of the slide lever is retained in the lever housing.

* * * * *